Patented Dec. 22, 1942

2,305,727

UNITED STATES PATENT OFFICE 2,305,727

COMPOUNDS OF THE CYCLOPENTANO-POLYHYDROPHENANTHRENE SERIES AND PROCESS OF MAKING SAME

Karl Miescher, Riehen, and Caesar Scholz, Basel, Switzerland, assignors, by mesne assignments, to Ciba Pharmaceutical Products, Incorporated, Summit, N. J., a corporation of New Jersey No Drawing. Application September 25, 1939, Serial No. 296,518. In Switzerland September 30, 1938

21 Claims. (Cl. 260—397.3)

This invention relates to the manufacture of compounds of the cyclopentanopolyhydrophenanthrene series by causing to act upon steroids which contain at the same carbon atom of the nucleus for example in 17- and/or 3-position a vinyl group and a member of the group consisting of a free, an esterified and an etherified hydroxyl group, agents capable of effecting an allyl-transformation of the said groupings. If desired the compound thus obtained may be treated with a reesterificating agent, such as a carboxylic acid salt or an alkali in the presence of an alcohol. After or instead of the reesterification the products may be treated with hydrolyzing agents in a manner in itself known. Such agents are for example hydroxides or carbonates of the alkalies or of the alkaline earth metals.

The parent materials may be made for example in any manner in itself known from carbonyl compounds of the cyclopentanopolyhydrophenanthrene series, for instance androsterones, dehydroandrosterones, androstendione, dihydrotestosterones, oestrone, hexahydro-oestrone, equiline, equilenine, pregnenolones, pregnendione or stereo-isomerides and derivatives thereof. Their steroid skeleton may be saturated or unsaturated and furthermore may for example contain as substituents substituted or non-substituted hydroxyl-, hydrocarbon-, amino- or carboxyl-groups or halogen atoms or keto-groups or the enol-derivatives of the latter. In any case they contain at the same carbon atom where the vinyl group is fixed a free hydroxyl group, a hydroxyl group esterified by organic or anorganic acids, e. g. carboxylic acids such as acetic acid, propionic acid, benzoic acid, phenyl acetic acid or succinic acid, sulfonic acids, hydrogen halides, sulfuric acid and the like, or a hydroxyl group etherified by alcohols or phenols, e. g., methyl-, ethyl-, benzyl alcohol, triarylcarbinols and the like.

For the purpose of effecting the allyl-transformation there may be used all the agents which are themselves known for this purpose to the expert, for instance acidic agents like low aliphatic carboxylic acids (formic acid, acetic acid), their anhydrides (acetic acid anhydride, propionic acid anhydride), their halogen derivatives (bromoacetic-acid, mono- and tri-chloro-acetic acid), sugar acids, inorganic acids (hydrogen halides) or phosphorus halides, such as phosphorus trichloride, phosphorus tribromide and the like. If desired the operation may be conducted at a raised temperature and/or in the presence of an indifferent solvent or gas or catalyst such as a tertiary base, for instance pyridine, quinoline, dimethylaniline and the like.

By the invention there are obtained nuclear saturated and unsaturated steriods containing for example in 17- and/or 3-position the bivalent radical of the formula $=CH-CH_2X$, wherein $X$ is a free, esterified or etherified hydroxyl group. Such products are for example the nuclear saturated and unsaturated $\Delta^{17,20}$-pregnene-21-ols such as $\Delta^{4,5;17,20}$-pregnadiene-3-one-21-ol or $\Delta^{5,6;17,20}$-pregnadiene-3,21-diol, the nuclear saturated and unsaturated $\Delta^{17,20}$-21-acyloxy-pregnenes such as $\Delta^{17,20}$-3,21-diacetoxy-pregnene or the nuclear saturated and unsaturated $\Delta^{17,20}$-21-halogen-pregnenes, for example the 21-bromo- or chloro-compounds like $\Delta^{4,5;17,20}$-21-bromo-pregnadiene-3-one or $\Delta^{5,6;17,20}$-21-chloro-pregnadiene-3-ol.

The compounds made by the invention may be used in therapeutics or as intermediate products for the manufacture of valuable therapeutic compounds.

The following examples illustrate the invention, the parts being by weight:

Example 1

1 part of 17-ethenyl-androstendiol-(3:17) is mixed with 1.4 parts of trichloracetic acid and 3 parts of glacial acetic acid and the mixture is heated for some time at 60° C., whereby it becomes pale brown. After cooling, the mass is diluted with much water and extracted from ether. The ethereal solution is washed with sodium carbonate and water, dried and then the solvent is distilled. The residual pale yellow oil is saponified by means of 20 parts of a methyl alcoholic solution of 5 per cent strength of caustic potash. The mass is then diluted with water and the product dissolved in chloroform. After the usual working up there is obtained a crystalline residue which may be purified by recrystallisation from methanol. This $\Delta^{5,6},\Delta^{17,20}$-pregnadiene-diol-(3:21) forms compact crystals of melting point 198–199° C. It forms a 3:21 diacetate of melting point 136.5–137° C., as well as a 3-mono-acetate of melting point 176.5–177° C.

Example 2

1 part of 17-ethenyl-androstenol-(17)one-(3) is dissolved in 4 parts of acetic anhydride. The solution is heated for a long time in an atmosphere of nitrogen at 120° C. When reaction is complete the mass is diluted with water and extracted with ether and worked up in the manner described in Example 1. The $\Delta^{4,5},\Delta^{17,20}$-pregnadienol-(21)-one-(3) is purified by fractional crystallization or sublimation in a high vacuum or chromatographic adsorption. It melts at 138-139° C.

*Example 3*

Into a solution of 1 part of 17-ethenyl-androstene-3,17-diol-3-mono-acetate in 1.2 parts of pyridine 0.6 part of cold phosphorus tribromide is introduced by drops at 0° C. while stirring. After standing for some time at room temperature, the whole is heated for a short time at 50° C. It is then mixed with water, extracted with ether and the ethereal solution washed with dilute acid and water and dried. The solvent is removed in a vacuum. By crystallization this $\Delta^{5,6},\Delta^{17,20}$-21-bromo-pregnadienol - (3) - acetate may be purified. It melts at 144-145° C. The bromide is heated for a short time with potassium acetate in glacial acetic acid. When no further separation of potassium bromide occurs the mass is cooled, diluted with water and extracted with ether; the ethereal solution is washed with water and evaporated. There is thus obtained the $\Delta^{5,6},\Delta^{17,20}$ - pregnadiendiol-(3:21)-diacetate of melting point 136.5-137° C. This compound is saponified with a methyl alcohol solution of potassium carbonate and worked up as described in Example 1. By recrystallization from methanol the $\Delta^{5,6},\Delta^{17,20}$-pregnadiendiol-(3:21) is obtained in compact crystals of melting point 198-199° C.

The conversion of the 21-bromide into the corresponding primary alcohol may also be effected in a ketone, for instance acetone, instead of in glacial acetic acid.

Instead of the 3-acetoxy-17-oxy-compound one may also start from the corresponding 17-tritylether. By treatment of for example 17-alkylethers with acetic anhydride and trichloroacetic acid one gets the $\Delta^{17,20}$-21-alkoxy-compounds. As parent materials there may be used also other hydroxy-vinyl-compounds, such as 3-hydroxy-3-vinyl-derivatives, obtainable for example from dihydrotestosterone.

*Example 4*

To a strongly cooled solution of 0.3 part of phosphorus tribromide in 4.5 parts of absolute chloroform there is added gradually by drops while stirring a solution of 1 part of 17-ethenyl-androstenol-(17)-one-(3) in 7.5 parts of absolute chloroform containing a trace of pyridine. The mixture is allowed to remain overnight without cooling. It is then mixed with chloroform and the chloroform solution washed with dilute hydrochloric acid, dilute sodium carbonate solution and water in succession. The neutral and dried solution is freed from the solvent. By crystallization this $\Delta^{4,5},\Delta^{17,20}$-21-bromo-pregnadienone-(3) is obtained pure. It melts at 130-131° C. The same product may be obtained if one starts from the corresponding 17-bromide.

A mixture of the 21-bromide and anhydrous potassium acetate is boiled under reflux for some hours in acetone. After cooling the whole is filtered and the filtrate is concentrated in a vacuum. By crystallization of the residue there is obtained the $\Delta^{4,5},\Delta^{17,20}$-21-acetoxy-pregnadienone-(3) of melting point 107° C. The same compound may be obtained directly by allyl-transformation of 17-ethenyl-17-acetoxy-androstenone-(3).

By saponifying the acetate with methylalcoholic solution of potassium carbonate and subsequently crystallizing the $\Delta^{4,5},\Delta^{17,20}$-pregnadienol-(21)-one-(3) of melting point 138-139° C. is obtained.

If instead of phosphorus tribromide phosphorus trichloride is used as reagent or if one starts from the 17-chloro-compound there is obtained the $\Delta^{4,5},\Delta^{17,20}$-21-chloro-pregnadienone-(3).

By starting from the corresponding nuclear saturated compound the $\Delta^{17,20}$-21-chloro- or -bromo-pregnene-one-(3) or the corresponding nuclear saturated 21-hydroxy- or 21-acyloxy-compound may be obtained, namely the $\Delta^{17,20}$-21-hydroxy- or 21-acetoxy-pregnene-3-ones. Naturally analogous 3-hydroxy-compounds or derivatives of the allo-pregnene series are manufactured in the same manner.

What we claim is:

1. A process for the manufacture of compounds of the cyclopentanopolyhydrophenanthrene series, which comprises reacting a steroid which contains at one of the carbons 3 and 17 a vinyl group and a member of the class consisting of free, esterified and etherified hydroxyl groups, with an agent capable of effecting an allyl-transformation of the said groupings.

2. A process for the manufacture of compounds of the cyclopentanopolyhydrophenanthrene series, which comprises reacting a steroid which contains at one of the carbons 3 and 17 a vinyl group and a member of the class consisting of free, esterified and etherified hydroxyl groups, with an agent capable of effecting an allyl-transformation of the said groupings and then with a hydrolyzing agent.

3. A process for the manufacture of compounds of the cyclopentanopolyhydrophenanthrene series, which comprises reacting a steroid which contains at one of the carbons 3 and 17 a vinyl group and a member of the class consisting of free, esterified and etherified hydroxyl groups, with a lower aliphatic carboxylic acid and then with a hydrolyzing agent.

4. A process for the manufacture of compounds of the cyclopentanopolyhydrophenanthrene series, which comprises reacting a steroid which contains at one of the carbons 3 and 17 a vinyl group and a member of the class consisting of free, esterified and etherified hydroxyl groups, with an acid anhydride and then with a hydrolyzing agent.

5. A process for the manufacture of compounds of the cyclopentanopolyhydrophenanthrene series, which comprises reacting a steroid which contains at one of the carbons 3 and 17 a vinyl group and a member of the class consisting of free, esterified and etherified hydroxyl groups, with a halogen derivative of a lower aliphatic carboxylic acid and then with a hydrolyzing agent.

6. A process for the manufacture of compounds of the cyclopentanopolyhydrophenanthrene series, which comprises reacting a steroid which contains at one of the carbons 3 and 17 a vinyl group and a member of the class consisting of free, esterified and etherified hydroxyl groups, with acetic anhydride and then with a hydrolyzing agent.

7. A process for the manufacture of compounds of the cyclopentanopolyhydrophenanthrene series, which comprises reacting a steroid which contains at one of the carbons 3 and 17 a vinyl group and a member of the class consisting of free, esterified and etherified hydroxyl groups, with trichloroacetic acid and then with a hydrolyzing agent.

8. A process for the manufacture of compounds of the cyclopentanopolyhydrophenanthrene series, which comprises reacting a steroid which contains at one of the carbons 3 and 17 a vinyl group and a member of the class consisting of free, esterified and etherified hydroxyl groups with phosphorus halide, and then successively with esterifying and hydrolyzing agents.

9. A process as claimed in claim 8, wherein the treatment with the esterifying agent is effected in a ketonic solvent.

10. A process for the manufacture of compounds of the cyclopentanopolyhydrophenanthrene series, which comprises reacting a steroid which contains at one of the carbons 3 and 17 a vinyl group and a free hydroxyl group, with phosphorus halide and then successively with esterifying and hydrolyzing agents.

11. A process for the manufacture of compounds of the cyclopentanopolyhydrophenanthrene series, which comprises reacting a steroid which contains at one of the carbons 3 and 17 a vinyl group and a free hydroxyl group, with phosphorus tribromide and then successively with esterifying and hydrolyzing agents.

12. The nuclear saturated and unsaturated steroids containing at one of the carbon atoms 3 and 17 a bivalent radical of the formula $=CH-CH_2X$, wherein $X$ is a member of the group consisting of free, esterified and etherified hydroxyl groups.

13. The nuclear saturated and unsaturated steroids containing in 17-position a bivalent radical of the formula $=CH-CH_2X$, wherein $X$ is a member of the group consisting of free, esterified and etherified hydroxyl groups.

14. The nuclear saturated and unsaturated $\Delta^{17,20}$-pregnene-21-ols.

15. The $\Delta^{4,5;17,20}$-pregnadiene-3-one-21-ol.

16. The nuclear saturated and unsaturated $\Delta^{17,20}$-21-halogen-pregnenes.

17. The nuclear saturated and unsaturated $\Delta^{17,20}$-21-bromo-pregnenes.

18. The $\Delta^{4,5;17,20}$-21-bromo-pregnadiene-3-one.

19. The nuclear saturated and unsaturated $\Delta^{17,20}$-21-acyloxy-pregnenes.

20. The nuclear saturated and unsaturated $\Delta^{17,20}$-21-acetoxy-pregnenes.

21. The $\Delta^{4,5;17,20}$ - 21 - acetoxy - pregnadiene-3-one.

KARL MIESCHER.
CAESAR SCHOLZ.